United States Patent
Chao et al.

(10) Patent No.: US 8,929,925 B2
(45) Date of Patent: Jan. 6, 2015

(54) METHOD AND SYSTEM TO REDUCE HARMONIC INTERFERENCE OF BROADBAND WIRELESS DEVICES TO GPS RECEIVER

(71) Applicant: Alcatel-Lucent USA Inc., Murray Hill, NJ (US)

(72) Inventors: Jim J. Chao, Naperville, IL (US); Subramanian Vasudevan, Morristown, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 111 days.

(21) Appl. No.: 13/828,884

(22) Filed: Mar. 14, 2013

(65) Prior Publication Data
US 2014/0274162 A1     Sep. 18, 2014

(51) Int. Cl.
  *H04W 24/00* (2009.01)
  *G08B 1/08* (2006.01)
  *G01C 21/10* (2006.01)
  *G01S 19/21* (2010.01)
  *H04W 4/02* (2009.01)

(52) U.S. Cl.
  CPC . *G01S 19/21* (2013.01); *H04W 4/02* (2013.01)
  USPC .......... 455/456.6; 455/456.1; 340/539.13; 701/467

(58) Field of Classification Search
  CPC ....... H04W 4/02; H04W 36/02; H04W 4/025; H04W 64/00; G06F 2221/2111; G01S 5/16; G01S 17/66; G01S 19/34; G01S 5/00
  USPC .............. 342/357.02, 357.06, 357.1, 357.15, 342/450; 701/207, 213, 215, 400, 408–409, 701/420, 467; 340/539.13; 455/456.3, 457
  See application file for complete search history.

(56) References Cited

U.S. PATENT DOCUMENTS

| | | | |
|---|---|---|---|
| 6,150,980 A * | 11/2000 | Krasner | 342/357.29 |
| 8,026,845 B2 * | 9/2011 | Wolf | 342/357.29 |
| 8,548,106 B2 * | 10/2013 | Lacatus et al. | 375/346 |
| 2006/0038719 A1 * | 2/2006 | Pande et al. | 342/357.12 |
| 2009/0146880 A1 * | 6/2009 | Chao et al. | 342/357.12 |

* cited by examiner

*Primary Examiner* — Nizar Sivji
(74) *Attorney, Agent, or Firm* — Fay Sharpe LLP

(57) ABSTRACT

A technique for reducing interference in a GPS-equipped wireless device having a transmitter is provided. In doing so, a GPS signal is acquired, and it is determined whether the GPS signal contains valid GPS data, the GPS signal having a GPS frequency range. If the GPS data is not valid due to the noted second harmonic interference, the transmit power levels of the transmitter within different categories of frequency blocks (frequency blocks corresponding to the second harmonic of the transmit frequency of the device interfering with the GPS frequency range entirely, partially and only slightly) are selectively and iteratively determined. The power levels in these frequency blocks are iteratively and selectively reduced to help determine valid GPS data.

14 Claims, 3 Drawing Sheets

CELLULAR UPPER 700MHz C AND D BLOCKS, AND GPS L1 BAND

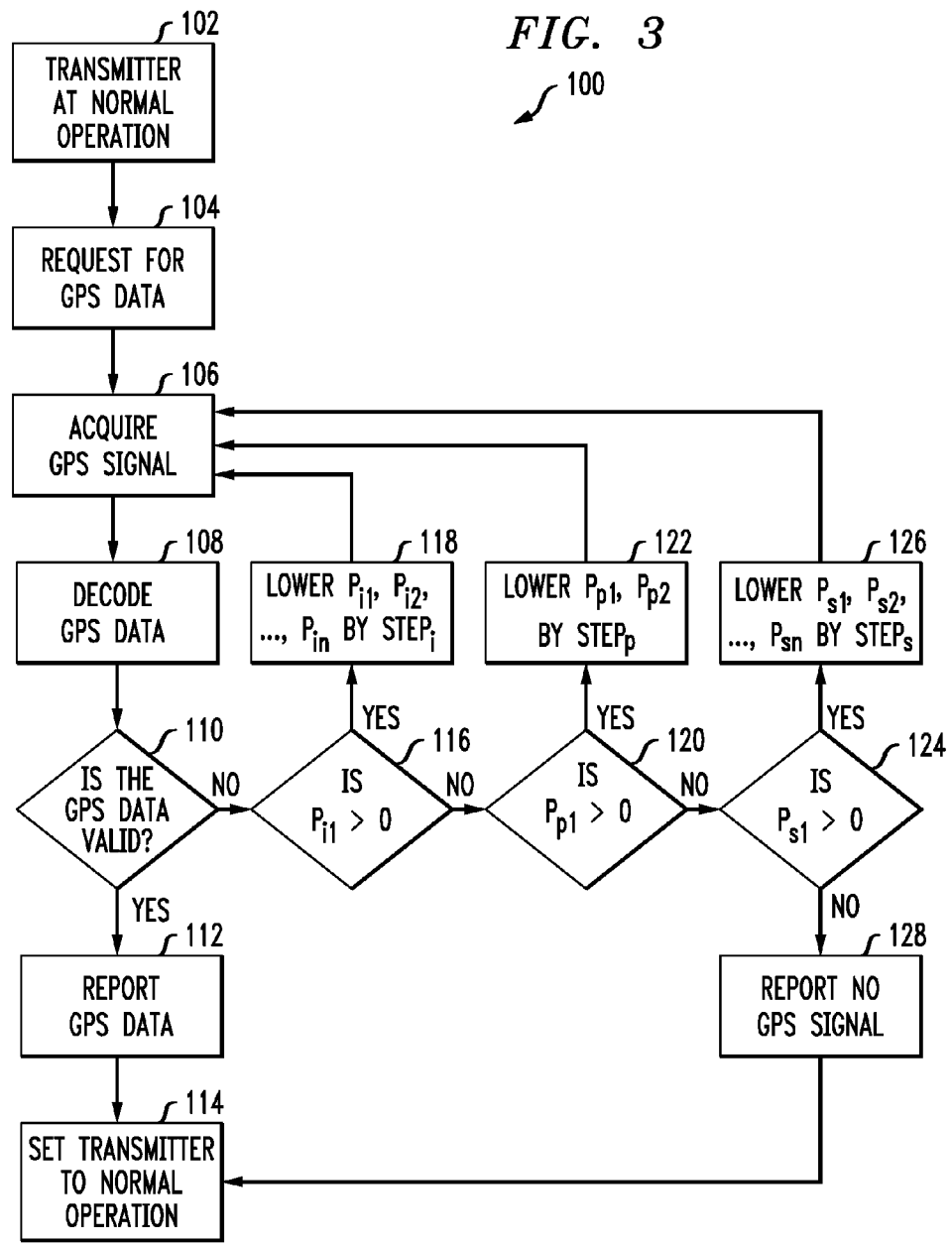

METHOD AND SYSTEM TO REDUCE HARMONIC INTERFERENCE OF BROADBAND WIRELESS DEVICES TO GPS RECEIVER

BACKGROUND

This disclosure relates to a method and system for reducing harmonic interference between broadband wireless devices and GPS receivers.

By way of background, a wireless or mobile device, such as a mobile phone, may be equipped with a built-in GPS receiver to support, for example, geo-location services and/or E911. However, in such cases, a problem arises inasmuch as the device may interfere with its own built-in GPS receiver. The reason for this interference is the second harmonic of the device's transmit frequency range may fall into the GPS frequency band.

For example, the GPS L1 Band (Civilian Navigation) has a range from 1565.42 MHz to 1585.42 MHz, and it is centered at 1575.42 MHz. The second harmonic of, for example, a typical mobile phone transmit frequency, e.g., the Upper 700 MHz C or D Block mobile transmitter frequency, could interfere with the noted GPS L1 Band used by the GPS receiver of the same phone.

SUMMARY OF THE INVENTION

A method and system for reducing harmonic interference between broadband wireless devices and GPS receivers are provided.

In one aspect of the presently described embodiments, the method comprises acquiring a GPS signal containing GPS data (the GPS signal having a GPS frequency range), decoding the GPS data, determining whether the GPS data is valid, and when the GPS data is not valid due to interference—first determining a transmit power level of the transmitter within a first plurality of frequency blocks that fall entirely within the GPS frequency range, the first plurality of frequency blocks corresponding to a second harmonic of a transmit frequency of the transmitter and, when the transmit power level for the first plurality of blocks is not zero, reducing the transmit power level stepwise for the first plurality of frequency blocks until valid GPS data is determined or until the transmit power level for the first plurality of frequency blocks is zero, second determining, if the transmit power level for the first plurality of frequency blocks is zero, a transmit power level of the transmitter within a second plurality of frequency blocks that fall partially within the GPS frequency range, the second plurality of frequency blocks corresponding to the second harmonic of the transmit frequency of the transmitter and, when the transmit power level for the second plurality of blocks is not zero, reducing the transmit power level stepwise for the second plurality of frequency blocks until valid GPS data is determined or until the transmit power level for the second plurality of frequency blocks is zero, and third determining, if the transmit power level for the second plurality of frequency blocks is zero, a transmit power level of the transmitter within a third plurality of frequency blocks that fall outside the GPS frequency range, the third plurality of frequency blocks corresponding to the second harmonic of the transmit frequency of the transmitter and, when the transmit power level for the third plurality of blocks is not zero, reducing the transmit power level stepwise for the third plurality of frequency blocks until valid GPS data is determined or until the transmit power level for the third plurality of frequency blocks is zero.

In another aspect of the presently described embodiments, the method further comprises, when the transmit power level is zero for the third plurality of frequency blocks, reporting that there is no GPS signal and setting the mobile transmitter to normal operation.

In another aspect of the presently described embodiments, the method further comprises, when the GPS data is valid, reporting the GPS data and setting the mobile transmitter to normal operation.

In another aspect of the presently described embodiments, the interference is caused by geo-location or E911 service.

In another aspect of the presently described embodiments, reducing the transmit power level for the first, second and third pluralities of frequency blocks comprises reducing power in steps of at least 1 dB.

In another aspect of the presently described embodiments, blocks of the first, second and third pluralities of frequency blocks are 1.25 MHz in width.

In another aspect of the presently described embodiments the wireless device is a phone.

In another aspect of the presently described embodiments, the system comprises a GPS receiver for acquiring a GPS signal containing GPS data, decoding the GPS data, and determining whether the GPS date is valid, and a power control module configured to perform the following when the GPS data is not valid due to interference—first determining a transmit power level of the transmitter within a first plurality of frequency blocks that fall entirely within the GPS frequency range, the first plurality of frequency blocks corresponding to a second harmonic of a transmit frequency of the transmitter and, when the transmit power level for the first plurality of blocks is not zero, reducing the transmit power level stepwise for the first plurality of frequency blocks until valid GPS data is determined or until the transmit power level for the first plurality of frequency blocks is zero, second determining, if the transmit power level for the first plurality of frequency blocks is zero, a transmit power level of the transmitter within a second plurality of frequency blocks that fall partially within the GPS frequency range, the second plurality of frequency blocks corresponding to the second harmonic of the transmit frequency of the transmitter and, when the transmit power level for the second plurality of blocks is not zero, reducing the transmit power level stepwise for the second plurality of frequency blocks until valid GPS data is determined or until the transmit power level for the second plurality of frequency blocks is zero and third determining, if the transmit power level for the second plurality of frequency blocks is zero, a transmit power level of the transmitter within a third plurality of frequency blocks that fall outside the GPS frequency range, the third plurality of frequency blocks corresponding to the second harmonic of the transmit frequency of the transmitter and, when the transmit power level for the third plurality of blocks is not zero, reducing the transmit power level stepwise for the third plurality of frequency blocks until valid GPS data is determined or until the transmit power level for the third plurality of frequency blocks is zero.

In another aspect of the presently described embodiments, the control module is further configured to report that there is no GPS signal and setting the mobile transmitter to normal operation when the transmitter power level for the third plurality of frequency blocks is zero.

In another aspect of the presently described embodiments, the control module is further configured to report the GPS data and set the mobile transmitter to normal operation when the GPS data is valid.

In another aspect of the presently described embodiments, the interference is caused by geo-location or E911 service.

In another aspect of the presently described embodiments, reducing the transmit power level for the first, second and third pluralities of frequency blocks comprises reducing power in steps of at least 1 dB.

In another aspect of the presently described embodiments, blocks of the first, second and third pluralities of frequency blocks are 1.25 MHz in width.

In another aspect of the presently described embodiments, the wireless device is a phone.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

Some embodiments of apparatus and/or methods in accordance with embodiments of the present invention are now described, by way of example only, and with reference to the accompanying drawings, in which:

FIG. 3 is a flowchart of a method according to the presently described embodiments.

DETAILED DESCRIPTION

According to the presently described embodiments, a technique for reducing interference in a GPS-equipped wireless device having a transmitter is implemented. In doing so, a GPS signal is acquired, and it is determined whether the GPS signal contains valid GPS data, the GPS signal having a GPS frequency range. If the GPS data is not valid due to the noted second harmonic interference, the transmit power levels of the transmitter within different categories of frequency blocks (for example, frequency blocks corresponding to the second harmonic of the transmit frequency of the device interfering with the GPS frequency range entirely, partially and only slightly) are selectively and iteratively determined. The power levels in these frequency blocks are iteratively and selectively reduced to help determine valid GPS data.

Figure 1:
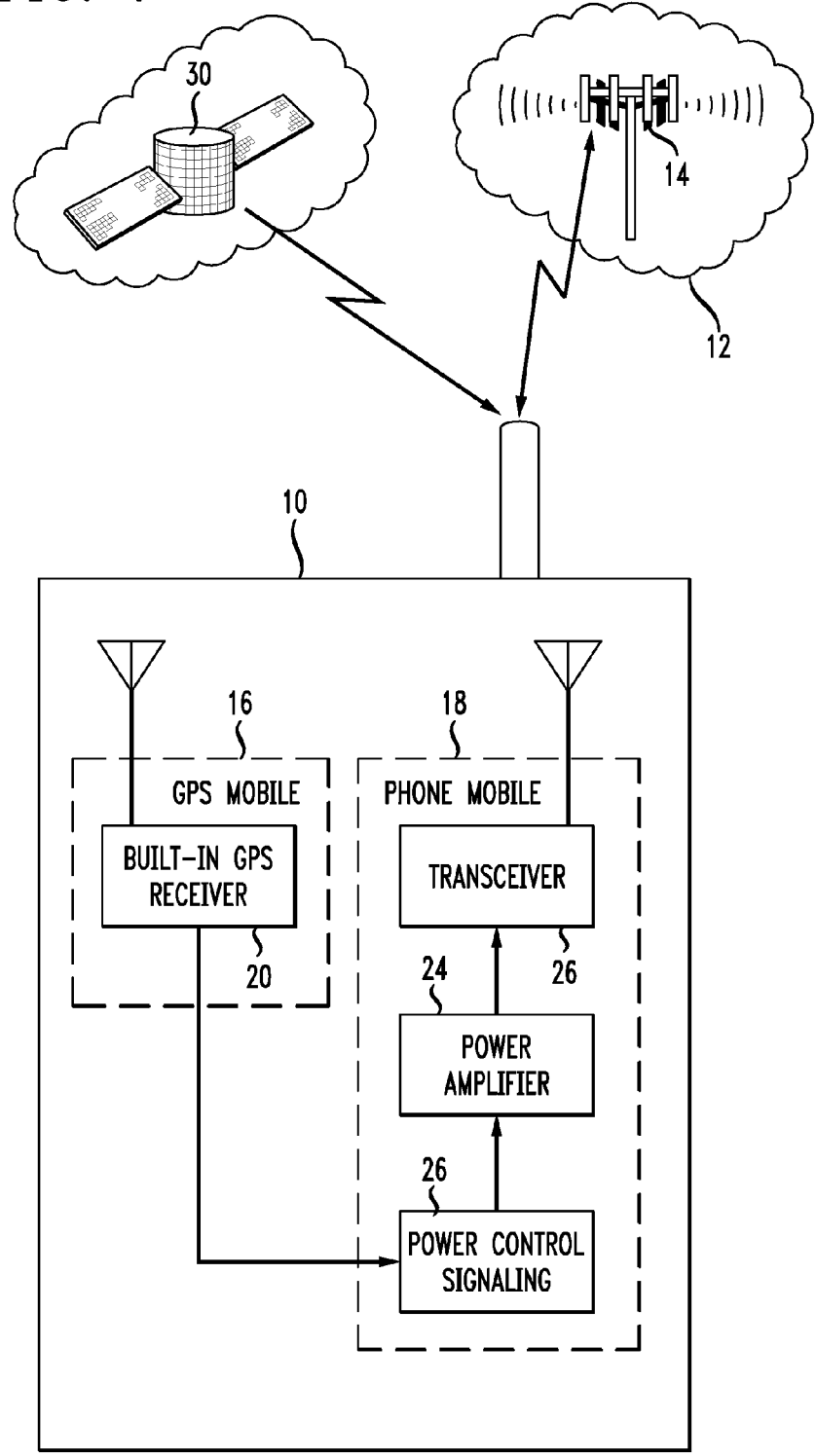
FIG. 1 is a block diagram of a system according to the presently described embodiments.

Referring now to the drawings wherein the showings are for purposes of illustrating the exemplary embodiments only and not for purposes of limiting the claimed subject matter, FIG. 1 provides a view of a system into which the presently described embodiments may be incorporated.

The wireless device 10 is shown as a mobile phone in FIG. 1. However, it may also be a wireless PDA, a computerized vehicle navigation system, a wireless device with high-speed data transfer capabilities, such as those compliant with "3-G" or "4-G" standards, a "WiFi"-equipped computer terminal, or the like.

The wireless device 10 is generally in communication with a wireless network 12. The wireless network 12 comprises any wireless network for providing voice and/or data communications, such as a cellular network, a PCS network, etc. The wireless network 12 includes a base station 14, which is configured to provide wireless service to any number of wireless devices. The base station 14 may communicates with wireless devices using Code Division Multiple Access (CDMA), Time Division Multiple Access (TDMA), Global System for Mobile Communication (GSM), Universal Mobile Telecommunications System (UMTS), 802.11 WiFi, BlueTooth (Registered), satellite, packet radio, or another protocol. The wireless network 12 may include many other base stations (not shown). It is to be understood that the wireless network 12 may include other devices, systems, or components not shown in FIG. 1, such as additional base stations, additional MSCs, a Home Location Register (HLR), etc. Further, the wireless network 12 may have interconnections not shown in FIG. 1. As shown generally, the wireless device 10 includes a GPS module 16 and a phone module 18.

The example configuration of FIG. 1 also illustrates a satellite link. As shown, a satellite 30 communicates with the wireless device 10. Of course, other configurations may be implemented.

The GPS module 16 generally includes a built-in GPS receiver 20 by which the wireless device 10 can obtain and store geographic position location information in automated fashion without user action. In one form, the receiver 20 communicates with the satellite 30.

The phone module 18 generally includes a power control signaling function 22, a power amplifier 24, and a transceiver 26. The mobile transceiver 26 generally includes a transmitter and a receiver for communicating with the corresponding base station receiver or transmitter via one or more links. A link typically may comprise a plurality of communication channels such as signaling channels and traffic channels, for example. Traffic channels are communication channels through which users convey (i.e., transmit and/or receive) user information. Signaling channels may be used by the system equipment to convey signaling information used to manage, operate and otherwise control the system. The system equipment, which may be typically owned, maintained and operated by a service provider, may include various known radio and processing equipment used in communication systems. The system equipment along with user equipment, for example, mobile phones, generates and receives the signaling information.

In broadband carrier situation, e.g. 5 MHz or 10 MHz, only part of the carrier signal may cause the above-noted second harmonic interference with the GPS receiver. According to the presently described embodiments, the broadband carrier can be considered as a plurality of narrower band frequency blocks. The frequency blocks can have a variety of different sizes but one example size is 1.25 MHz wide. Other sizes such as 1 MHz could also be appropriate. In this regard, some of these narrower band frequency blocks may cause second harmonic interference with the GPS receiver, but others of these narrower band frequency blocks do not interfere.

Figure 2:
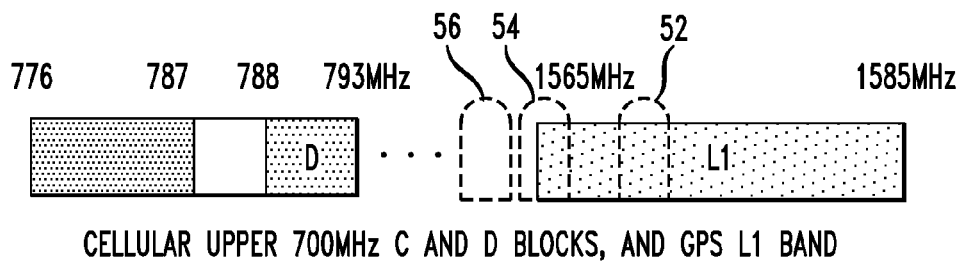
FIG. 2 is a representation of a frequency spectrum.

With reference to FIG. 2, a frequency spectrum 50 is illustrated. The spectrum 50 shows Cellular Upper 700 MHz C and D blocks, as well as the GPS L1 Band. The C block has an approximate range of 776 MHz to 787 MHz. The D block has an approximate range of 788 MHz to 793 MHz. The L1 band has and approximate range of 1565 MHz to 1585 MHz. As shown, a block 52 represents a frequency block of second harmonic interference that falls entirely in the L1 band and causes interference. Block 54 represents a frequency block of second harmonic interference that falls partially in the L1 band and partially causes interference. Block 56 represents a frequency block of second harmonic interference that falls outside the L1 band and only slightly causes interference. In this example embodiment, the second harmonic interference is defined as being 22 and 10 MHz wide for C and D blocks respectively. Accordingly, for C block, 8.75 MHz is categorized as "entirely" within the L1 band, 1.25 MHz of overlap is categorized as "partially" within the L1 band, and 12 MHz is categorized as not within the L1 band. Similarly for D block, 8.75 MHz frequency block is categorized as "entirely" within the L1 band, 1.25 MHz frequency block is categorized as "partially" within the L1 band, and no second harmonic interference frequency block is categorized as not within the L1 band.

According to the presently described embodiments, broadband carrier signals can thus be divided into a plurality of narrower band frequency blocks, as represented in FIG. 2. Some of those blocks may cause second harmonic interference to GPS receiver if their second harmonics fall entirely into the GPS frequency range (e.g., block 52). Their transmit powers are labeled as Pi1, Pi2, . . . , Pin. One or two of those blocks may only partially cause second harmonic interference to GPS receiver if their second harmonics partially fall into the GPS frequency range (e.g. block 54). Their transmit powers are labeled as Pp1, Pp2, . . . , Ppn. Some of those blocks may only slightly cause second harmonic interference to GPS receiver due to the non-ideal ACLR of GPS receiver if their second harmonics do not fall into but close to the GPS frequency range (e.g. block 56). Their transmit powers are labeled as Ps1, Ps2, . . . , Psn. The seriousness of interference caused by these types of blocks from high to low is in the order of Pi, Pp, Ps. Some of those blocks may not cause second harmonic interference to GPS receiver if their second harmonics do not fall into the GPS frequency range, their transmit powers are labeled as P1, P2, . . . , Pn.

Accordingly, the second harmonic interference produced by the mobile transmitter, which interferes with its own GPS receiver, will be reduced by selectively stepping down the power of a) Pi1, Pi2, . . . , Pin, b) Pp1, Pp2 Ppn, and c) Ps1, Ps2, . . . , Psn. First, the Pi1, Pi2, . . . , Pin will be stepped down until the mobile device is able to acquire GPS signals and synchronize with GPS. If the Pi1, Pi2, . . . , Pin are stepped down to zero but the mobile is still unable to acquire GPS signals and synchronize with GPS, then Pp1, Pp2, . . . , Ppn will be stepped down until the mobile device is able to acquire GPS signals and synchronize with GPS. If the Pi1, Pi2 Pi1, . . . , Pin blocks and the Pp1, Pp2, . . . , Ppn blocks are stepped down to zero and the mobile is still unable to acquire GPS signals and synchronize with GPS, then the Ps1, Ps2, . . . , Psn will be stepped down until the mobile be able to acquire GPS signals and synchronize with GPS.

It should be appreciated that, when a frequency block is stepped down to zero, the overall transmission bandwidth becomes narrower.

In one implementation of the above described technique, with reference now to FIG. 3, a method 100 is illustrated. It should be appreciated that the method may be implemented using a variety of software routines and/or hardware configurations. For example, the method 100 may be implemented in the power control signaling module 22 of the phone module 18 of the mobile device system 10 (FIG. 1). Of course, other modules within the device 10 may also store and/or execute suitable routines with respect to and/or to implement the method 100.

Referring back to FIG. 3, the method 100 is initiated while the transmitter is in normal operation (at 102). When GPS data is requested (at 104), the built-in GPS receiver 20 will attempt to acquire GPS signal (at 106) and then decode and receive GPS data (at 108). Next, the GPS receiver 20 will determine whether the GPS is valid (at 110).

If the GPS data is valid, then the GPS data is simply reported to the mobile station phone module 18 (at 112) and the mobile transmitter is set to normal operation (at 114).

However, if the GPS data is not valid, the broadband carrier transmitting spectrum of the mobile device is treated as a plurality of narrowband blocks of such spectrum. Accordingly, blocks that may cause second harmonic interference with the GPS receiver by falling entirely into the GPS frequency range (Pi1, Pi2, . . . etc.) are first analyzed to determine if their power is greater than 0 (at 116). If so, power is reduced by stepping down the power of these blocks (at 118). This process is run until the mobile device is able to acquire GPS signals and synchronize with GPS, or until the power is reduced to zero for these blocks.

In the case where the power is stepped down to zero for these blocks, it is determined whether the blocks that partially cause second harmonic interference with the GPS receiver (Pp1, Pp2, . . . etc.) have transmit power greater than 0 (at 120). If so, these blocks are stepped down an appropriate magnitude until the mobile device is able to acquire GPS signals and synchronize with GPS, or until the power in the blocks is stepped down to zero.

In the case where the power is stepped down to zero for these blocks, the blocks that may only slightly cause second harmonic interference with the GPS receiver (Ps1, Ps2, . . . etc.) are analyzed to determine whether power levels greater than 0. If so, the power is stepped down in those blocks until such time as a signal is acquired and synchronization is achieved with the GPS, or the frequency block is stepped down to 0. If no GPS signal is recovered, it is reported that no GPS signal is available (at 128).

For ease of reference, assume the steps for the noted step-down of power for the blocks Pi, Pp, and Ps are STEPi, STEPp, and STEPs, respectively. It should be appreciated that the seriousness of interference caused by these types of blocks may be treated as, for example, high to low. Accordingly, in one form, the STEPs is larger than or equal to STEPp, and STEPp is larger than or equal to STEPi. For example, STEPi=1 dB, STEPp=2 dB, and STEPs=3 dB. Alternatively, the steps may have the following relationship: STEPi=STEPp=STEPs=1 dB.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as magnetic disks and magnetic tapes, hard drives, or optically readable digital data storage media. The embodiments are also intended to cover computers programmed to perform said steps of the above-described methods.

It should also be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method of reducing interference in a GPS-equipped wireless device having a transmitter, the method comprising:
acquiring a GPS signal containing GPS data, the GPS signal having a GPS frequency range;
decoding the GPS data;
determining whether the GPS data is valid;
when the GPS data is not valid due to interference—
first determining a transmit power level of the transmitter within a first plurality of frequency blocks that fall entirely within the GPS frequency range, the first plurality of frequency blocks corresponding to a second harmonic of a transmit frequency of the transmitter and,
when the transmit power level for the first plurality of blocks is not zero, reducing the transmit power level stepwise for the first plurality of frequency blocks until valid GPS data is determined or until the transmit power level for the first plurality of frequency blocks is zero;
second determining, if the transmit power level for the first plurality of frequency blocks is zero, a transmit power level of the transmitter within a second plurality of frequency blocks that fall partially within the GPS frequency range, the second plurality of frequency blocks corresponding to the second harmonic of the transmit frequency of the transmitter and,
when the transmit power level for the second plurality of blocks is not zero, reducing the transmit power level stepwise for the second plurality of frequency blocks until valid GPS data is determined or until the transmit power level for the second plurality of frequency blocks is zero; and,
third determining, if the transmit power level for the second plurality of frequency blocks is zero, a transmit power level of the transmitter within a third plurality of frequency blocks that fall outside the GPS frequency range, the third plurality of frequency blocks corresponding to the second harmonic of the transmit frequency of the transmitter and,
when the transmit power level for the third plurality of blocks is not zero, reducing the transmit power level stepwise for the third plurality of frequency blocks until valid GPS data is determined or until the transmit power level for the third plurality of frequency blocks is zero.

2. The method of claim 1, further comprising:
when the transmit power level is zero for the third plurality of frequency blocks, reporting that there is no GPS signal and setting the mobile transmitter to normal operation.

3. The method of claim 1, further comprising:
when the GPS data is valid, reporting the GPS data and setting the mobile transmitter to normal operation.

4. The method of claim 1, wherein the interference is caused by geo-location or E911 service.

5. The method as set forth in claim 1 wherein reducing the transmit power level for the first, second and third pluralities of frequency blocks comprises reducing power in steps of at least 1 dB.

6. The method as set forth in claim 1 wherein blocks of the first, second and third pluralities of frequency blocks are 1.25 MHz in width.

7. The method as set forth in claim 1 wherein the wireless device is a phone.

8. A system for reducing interference in a wireless device, the system comprising:
a GPS receiver for acquiring a GPS signal containing GPS data, decoding the GPS data, and determining whether the GPS date is valid; and,
a power control module configured to perform the following when the GPS data is not valid due to interference—
first determining a transmit power level of the transmitter within a first plurality of frequency blocks that fall entirely within the GPS frequency range, the first plurality of frequency blocks corresponding to a second harmonic of a transmit frequency of the transmitter and,
when the transmit power level for the first plurality of blocks is not zero, reducing the transmit power level stepwise for the first plurality of frequency blocks until valid GPS data is determined or until the transmit power level for the first plurality of frequency blocks is zero;
second determining, if the transmit power level for the first plurality of frequency blocks is zero, a transmit power level of the transmitter within a second plurality of frequency blocks that fall partially within the GPS frequency range, the second plurality of frequency blocks corresponding to the second harmonic of the transmit frequency of the transmitter and,
when the transmit power level for the second plurality of blocks is not zero, reducing the transmit power level stepwise for the second plurality of frequency blocks until valid GPS data is determined or until the transmit power level for the second plurality of frequency blocks is zero; and,
third determining, if the transmit power level for the second plurality of frequency blocks is zero, a transmit power level of the transmitter within a third plurality of frequency blocks that fall outside the GPS frequency range, the third plurality of frequency blocks corresponding to the second harmonic of the transmit frequency of the transmitter and,
when the transmit power level for the third plurality of blocks is not zero, reducing the transmit power level stepwise for the third plurality of frequency blocks until valid GPS data is determined or until the transmit power level for the third plurality of frequency blocks is zero.

9. The system as set forth in claim 8 wherein the control module is further configured to report that there is no GPS signal and setting the mobile transmitter to normal operation when the transmitter power level for the third plurality of frequency blocks is zero.

10. The system as set forth in claim 8 wherein the control module is further configured to report the GPS data and set the mobile transmitter to normal operation when the GPS data is valid.

11. The system as set forth in claim 8, wherein the interference is caused by geo-location or E911 service.

12. The system as set forth in claim 8 wherein reducing the transmit power level for the first, second and third pluralities of frequency blocks comprises reducing power in steps of at least 1 dB.

13. The system as set forth in claim 8 wherein blocks of the first, second and third pluralities of frequency blocks are 1.25 MHz in width.

14. The system as set forth in claim 8 wherein the wireless device is a phone.

* * * * *